United States Patent
Mellein et al.

(10) Patent No.: US 11,996,898 B2
(45) Date of Patent: May 28, 2024

(54) METHOD FOR DETERMINING A PRE-EQUALIZATION MATRIX AND TEST SETUP

(71) Applicant: Rohde & Schwarz GmbH & Co. KG, Munich (DE)

(72) Inventors: Heinz Mellein, Munich (DE); Oussema Harguem, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 306 days.

(21) Appl. No.: 17/484,254

(22) Filed: Sep. 24, 2021

(65) Prior Publication Data

US 2022/0140918 A1 May 5, 2022

(30) Foreign Application Priority Data

Oct. 30, 2020 (EP) .................................... 20204960

(51) Int. Cl.
*H04B 17/00* (2015.01)
*H04B 7/0413* (2017.01)
(Continued)

(52) U.S. Cl.
CPC ....... *H04B 17/0085* (2013.01); *H04B 7/0413* (2013.01); *H04B 7/0456* (2013.01); *H04B 17/318* (2015.01)

(58) Field of Classification Search
CPC .................. H04B 17/0085; H04B 7/0413; H04B 7/0456; H04B 17/318; H04B 17/3911;
(Continued)

(56) References Cited

U.S. PATENT DOCUMENTS 9,674,007 B1 * 6/2017 Wicker, Jr. ............ H04B 17/14
9,742,508 B1   8/2017 Kyosti et al.
(Continued)

FOREIGN PATENT DOCUMENTS

EP   3565135 A1   11/2019

OTHER PUBLICATIONS

Agilent Technologies, Tri-L Solutions, "Incorporating self-interference into the two-stage method," 3GPP TSG RAN WG4 Meeting #66 MIMO OTA Ah hoc, Munich, Germany Mar. 12-13, 2013, 8 pages.

*Primary Examiner* — Brian T O'Connor
(74) *Attorney, Agent, or Firm* — CHRISTENSEN O'CONNOR JOHNSON KINDNESS PLLC

(57) ABSTRACT

A method for determining a pre-equalization matrix to be used for testing is provided. A radio communication tester is provided that has a base station emulator and a channel emulator. A device under test is provided that has at least two branches. A N×M multiple-input multiple-output (MIMO) connection is established between the radio communication tester and the device under test. The N×M MIMO connection includes at least two channels. Reference signal received power per branch measurement values are continuously forwarded from the device under test to the radio communication tester. A pre-equalization matrix is determined by the radio communication tester, wherein the reference signal received power per branch measurement values and presence of additive white Gaussian noise (AWGN) are taken into account when calculating the pre-equalization matrix. The pre-equalization matrix compensates cross-talk between the at least two channels and balances the branches such that the device under test receives equal power at its reception antennas. Further, a test setup is described.

20 Claims, 2 Drawing Sheets

(51) Int. Cl.
*H04B 7/0456* (2017.01)
*H04B 17/318* (2015.01)

(58) Field of Classification Search
CPC .... H04B 17/12; H04B 17/00; H04B 17/0082; H04B 17/15; H04B 17/21; H04W 24/02; H04W 24/06; G01R 31/31905; G01R 31/31908; G01R 31/31926; G01R 31/002; G01R 29/0814; G01R 31/31723; G01R 31/31724; H04K 3/68; H04L 43/50; H04L 43/0894
See application file for complete search history.

(56) References Cited

U.S. PATENT DOCUMENTS

| | | | |
|---|---|---|---|
| 10,313,034 B2 * | 6/2019 | Rodriguez-Herrera | H04B 17/391 |
| 10,587,350 B2 * | 3/2020 | Rodriguez-Herrera | H04B 17/3912 |
| 11,509,404 B2 * | 11/2022 | Friesinger | H04B 17/14 |
| 11,668,740 B2 * | 6/2023 | Grossmann | H04B 17/21 324/615 |
| 2020/0191848 A1 * | 6/2020 | Grossmann | H04B 17/12 |
| 2023/0171009 A1 * | 6/2023 | Han | H04B 17/15 370/252 |
| 2023/0198817 A1 * | 6/2023 | Frank | H04B 7/0413 375/232 |

* cited by examiner

METHOD FOR DETERMINING A PRE-EQUALIZATION MATRIX AND TEST SETUP

FIELD OF THE DISCLOSURE

Embodiments of the present disclosure relate to a method for determining a pre-equalization matrix to be used for testing. Further, embodiments of the present disclosure relate to a test setup for testing a device under test.

BACKGROUND

In the state of the art, over-the-air (OTA) measurements of a device under test are known wherein a pre-equalization matrix is determined. Then, the pre-equalization matrix is applied in order to pre-equalize a radio channel established between a radio communication tester and the device under test. Accordingly, the signal outputted by the radio communication tester is adapted by the pre-equalization matrix such that the signal received by the device under test is already equalized. In some embodiments, the pre-equalization matrix and a channel matrix, also called transfer matrix, compensate each other, wherein the channel matrix describes the influences that occur in the radio channel established between the device under test and the radio communication tester.

Accordingly, the channel matrix for the respective radio channel has to be determined and mathematically inverted, thereby obtaining the pre-equalization matrix that can be used for equalizing the radio channel. Then, quasi-conducted test conditions for the device under test are obtained, as the influence of the radio channel are equalized by applying the pre-equalization matrix. Since quasi-conducted test conditions are achieved, OTA conformance testing of the device under test can be performed. In EP 3 565 135 A1, which is incorporated by reference in its entirety, a system and a method for inverting the channel matrix are described.

However, the concept known in the state of the art is very time-consuming, as the channel matrix has to be determined and inverted, which might require mathematically complex processes.

Accordingly, there is a need for a simple and fast approach to establish quasi-conducted test conditions for the device under test such that OTA conformance testing of the device under test can be performed.

SUMMARY

Embodiments of the present disclosure provide a method for determining a pre-equalization matrix to be used for testing. In an embodiment, the method comprising the steps of:
providing a radio communication tester having a base station emulator and a channel emulator,
providing a device under test having at least two branches,
establishing a N×M multiple-input multiple-output (MIMO) connection between the radio communication tester and the device under test, the N×M MIMO connection comprising at least two channels,
forwarding reference signal received power per branch (RSRP-B) measurement values continuously from the device under test to the radio communication tester, and
determining a pre-equalization matrix by the radio communication tester, wherein the reference signal received power per branch measurement values and presence of additive white Gaussian noise (AWGN) are taken into account when calculating the pre-equalization matrix, and wherein the pre-equalization matrix compensates cross-talk between the at least two channels and balances the branches such that the device under test receives equal power at its reception antennas.

Accordingly, quasi-conducted test conditions for the device under test are achieved such that over-the-air (OTA) conformance testing can be performed, wherein additive white Gaussian noise (AWGN) is considered, for example respective influences associated with non-intrinsic noise. The additive white Gaussian noise (AWGN) simulates the effect of many random processes that occur in nature. For instance, the AWGN encompasses many different natural noise sources, such as thermal vibrations of atoms in conductors, also called thermal noise, shot noise or any other natural noise sources. In some embodiments, the AWGN relates to a basic noise model used in information theory, wherein it is assumed that the summation of many random processes has a Gaussian distribution. Thus, the AWGN is Gaussian because the noise has a normal distribution in time domain. Further, the AWGN is white because the power of the noise is distributed uniformly across the frequency. Moreover, the AWGN is additive since the respective noise is added to any intrinsic noise of the test setup. For instance, the AWGN may be calculated and generated accordingly, wherein the AWGN is (artificially) introduced into a test chamber, for instance an anechoic chamber. Alternatively, the AWGN is calculated and (only) mathematically considered when determining the pre-equalization matrix.

Since the device under test forwards the RSRP-B measurement values to the radio communication tester, for example the channel emulator, a respective feedback of the device under test is provided that is taken into consideration by the radio communication tester when calculating the pre-equalization matrix. Hence, the influence of the additive white Gaussian noise (AWGN) is considered appropriately, as the influence of the AWGN has an impact on the RSRP-B measurement values that are fed back to the radio communication tester.

Generally, the reference signal received power per branch (RSRP-B) is a measurement of the received power level per branch of the device under test, namely per receiving branch. The reference signal received power (RSRP) is a Received Signal Strength Indicator (RSSI) type of measurement.

In some embodiments, the reference signal received power per branch (RSRP-B) corresponds to the linear average over the power contributions of the resource elements. The reference signal received power per branch (RSRP-B) is also called reference signal receiving power per branch (RSRP-B).

The device under test may have at least two (reception) antennas that are associated with the at least two branches of the device under test. The at least two (reception) antennas establish the MIMO connection with the radio communication tester, for example at least two transmission antennas of the radio communication tester.

In general, the power dynamic range can be maximized, as the (remaining) branches of the device under test are balanced by the pre-calibration matrix. As cross-talk between the channels can be compensated by the pre-calibration matrix, the isolation between reception antennas of the device under test is maximized, yielding improved testing conditions.

Accordingly, cross-talk of the channels can be minimized and isolation between the branches or rather antennas of the device under test can be improved when applying the pre-equalization matrix during the testing of a device under test.

Since the radio communication tester comprises the base station emulator and the channel emulator, the respective channels are emulated channels that may simulate real radio communication channels established between the device under test and a real base station.

The base station emulator may be configured to emulate different kinds of base stations. Further, the channel emulator may be configured to emulate different kinds of channels. Hence, the same radio communication setup may be emulated for different conditions, for instance an ideal channel, a real channel and/or a disturbed channel.

The radio communication tester, for example the channel emulator, is configured to selectively activate a certain number of channels during the testing/calibration in order to determine the pre-equalization matrix. Thus, only one channel may be activated at once or rather two channels simultaneously. In some embodiments, the respective number of channels activated simultaneously may vary, as it depends on the step performed for determining the pre-equalization matrix.

In some embodiments, at least two different steps are performed when determining the pre-equalization matrix, wherein the at least two different steps are associated with different numbers of channels activated, for instance a single channel in a first step and two or more channels in a second step.

The device under test may be a 5G user equipment, for instance a tablet or a phone such as a smartphone. Further, the base station emulator may be a 5G base station emulator that is configured to establish a 5G connection with the device under test.

In general, the channel matrix is estimated based on the feedback provided by the device under test, namely the quantized power per branch. Based on the feedback from the device under test, the pre-equalization matrix is determined, for example approximated, thereby minimizing cross-talk between the channels and maximizing power dynamic range across the respective OTA channel.

Further, the N×M MIMO connection means that N and M are equal or greater than 2 in order to establish the MIMO connection. In some embodiments, the N×M MIMO connection is a 2×2 connection such that two transmission antennas of the radio communication tester and two reception antennas of the device under test are involved. In some embodiments, the 2×2 connection ensures that the respective pre-calibration matrix can be determined easily.

An aspect provides that it is verified if the pre-equalization matrix calculated solves the optimization problem $\min\|A \cdot G - I\|_2$, wherein A relates to a transfer matrix, G relates to the pre-equalization matrix and I relates to the identity matrix. The verification may be done continuously, for example once the pre-equalization matrix is available even though the respective pre-equalization matrix available does not correspond to the optimized one. As mentioned above, the pre-equalization matrix is determined or rather estimated based on the reference signal received power per branch (RSRP-B) measurement values while considering AWGN such that the pre-equalization matrix determined/estimated usually does not correspond to the inverted channel matrix. Therefore, it is verified if the estimated/determined pre-equalization matrix approximates the inverted channel matrix, thereby reducing the result of the condition $\|A \cdot G - I\|_2$ to be solved by the optimization problem mentioned above.

As the AWGN is taken into consideration when calculating the pre-equalization matrix, the pre-equalization matrix does not correspond to the inverse of the transfer matrix.

In some embodiments, the transfer matrix describes the N×M MIMO connection between the radio communication tester and the device under test. The transfer matrix may describe the (ideal) channel established between the radio communication tester and the device under test.

According to another aspect, the pre-equalization matrix is obtained by multiplying the inverse of a compensation matrix having compensation parameters and a balancing matrix having balancing parameters. Hence, the pre-equalization matrix is based on two matrices that have different purposes, namely compensation and balancing, thereby ensuring that the pre-equalization matrix determined compensates the cross-talk between the at least two channels and balances the branches of the device under test simultaneously when applied during the testing of the device under test. Thus, the device under test receives equal power at its reception antennas.

For instance, an initialization phase takes place during which the respective parameters of the compensation matrix and the balancing matrix are initialized. During the initialization phase, the compensation parameters of the compensation matrix as well as the balancing parameters of the balancing matrix are initialized by initialized values. For instance, the compensation parameters and the balancing parameters equal 1 in the initialization phase.

Further, an initial calibration of the compensation matrix may be performed, thereby initially calibrating amplitude values of the compensation parameters. The initial calibration may be part of the initialization phase, wherein the respective amplitude values of the compensation parameters are determined initially while starting from the initialized values, for instance 1. Hence, initially calibrated values of the amplitude values are obtained after the initial calibration that may differ from the initialized values.

In some embodiments, the amplitude values of the compensation parameters are determined during the initial calibration by taking the reference signal received power per branch measurement values into account. The respective measurement values fed back from the device under test are considered by the radio communication tester, for example the channel emulator. The respective measurement values received are processed accordingly, thereby determining the amplitude values of the compensation parameters in order to obtain the initially calibrated amplitude values that may differ from the initialized values, namely the starting values.

Another aspect provides that, during the initial calibration, only one channel is activated at once and the reference signal received power per branch measurement values are collected by each branch. Thus, the respective amplitude values of the compensation parameters can be determined by $$|\omega_{ij}| = \frac{RSRP_{ij}}{RSRP_{ii}},$$

wherein $RSRP_{ij}$ is the RSRP-B from branch $R_j$ while only activating the respective channel $T_i$. This is done for each channel $T_i$ such that all compensation parameters can be determined successively.

According to a further aspect, the compensation matrix is determined during an optimization phase, thereby optimizing the compensation parameters of the compensation matrix. During the optimization phase, the initialized values are optimized in order to determine optimal values for the compensation matrix such that the compensation matrix is determined in an improved manner.

In some embodiments, optimal phase values and/or optimal amplitude values for the compensation parameters are determined during the optimization phase. A suitable search interval for the phase values of the compensation parameters is determined that is used in order to find the optimal phase values for the compensation parameters. Once the optimal phase values are determined, the amplitude values may be optimized subsequently.

Hence, the optimization phase may comprise a two-step approach, as the phase values and the amplitude values of the compensation parameters are optimized subsequently, thereby optimizing the compensation parameters entirely. The optimization of the amplitude values ensure that they are optimized with respect to the values obtained during the initialization phase, for example during the initial calibration.

For instance, the optimal phase values are determined by pairwise activating two channels while deactivating all other channels. The optimal phase values provide the highest mutual (pairwise) isolation between the reception antennas of the device under test. The isolation corresponds to a destructive interference.

The pairwise activation of the channels, namely the activation of transmitter pairs, is repeated for each possible transmitter pair successively. By doing so, the entire compensation matrix is optimized accordingly.

When optimizing the amplitude values afterwards, the mutual (pairwise) isolation between the branches of the device under test is improved further.

As mentioned above, the radio communication tester, for example the channel emulator, is configured to selectively activate different numbers of channels during the testing/calibration in order to determine the pre-equalization matrix. During the initialization phase (first step) only a single channel is activated at once, whereas during the optimization phase (second step) two channels are activated at once. Hence, two different numbers of channels are activated during the calibration in order to determine the pre-equalization matrix.

Generally, a modified standard search algorithm can be applied for determining the optimal phase values and/or the optimal amplitude values.

In some embodiments, the optimization phase takes place after the initialization phase and/or the initial calibration. The respective compensation parameters of the compensation matrix are set to initial values during the initialization phase, which correspond to starting points. During the initial calibration, initially calibrated amplitude values are determined. In the subsequent optimization phase, the compensation parameters are optimized.

Once the optimization phase has been completed, the compensation matrix obtained can be inversed, thereby obtaining the inverse of the compensation matrix. The inversion of the compensation matrix may be done by numerical methods (depending on the rank of the compensation matrix).

Generally, the inverted compensation matrix and the balancing matrix are multiplied with each other in order to arrive at the pre-equalization matrix.

According to another aspect, the balancing matrix is determined during an adjustment phase, thereby adjusting the balancing parameters. During the adjustment phase, the balancing matrix is optimized with regard to its purpose, namely providing an equal power distribution at the branches of the device under test. In other words, the device under test receives equal power at its reception antennas.

For instance, the adjustment phase takes place after the optimization phase. The balancing parameters are adjusted subsequently. Hence, cross-talk is minimized by optimizing the compensation matrix. Afterwards, the balancing matrix is varied by adjusting the balancing parameters in order to ensure that the branches of the device under test each receive an equal power.

Generally, the optimized pre-equalization matrix corresponds to the one obtained after the steps mentioned above are performed, namely the optimization phase and the adjustment phase. As mentioned above, the optimized pre-equalization matrix does not necessarily correspond to the inverse of the channel matrix or rather transfer matrix, as it is derived from the RSRP-B measurement values.

Furthermore, an intermediate pre-equalization matrix may be determined after the initialization phase and/or the optimization phase, wherein the intermediate pre-equalization matrix may be used for the optimization problem mentioned above.

Accordingly, a solution may be obtained in a very fast manner, resulting in a significant speed advantage compared to the techniques known in the state of the art provided that the intermediate pre-equalization matrix already solves the optimization problem given above. Even if the intermediate pre-equalization matrix does not solve the optimization problem given above, the method is significantly faster, as it is not necessary to determine the inversed channel matrix or rather transfer matrix.

Generally, the reference signal received power per branch measurement values forwarded by the device under test are processed by the radio communication tester, for example the channel emulator, in order to determine/estimate the pre-equalization matrix, for instance the compensation matrix based on which the pre-equalization matrix is computed.

Moreover, embodiments of the present disclosure provide a test setup for testing a device under test. The test setup comprises a radio communication tester as well as a device under test. The test setup is configured to perform, for example, one or more methods described above. The characteristics and advantages mentioned above also apply to the test setup in a similar manner Hence, reference is made to the explanations given above.

The test setup may also comprise an anechoic chamber that encompasses the device under test during the testing and the determination of the pre-equalization matrix. In other words, the device under test is located in the anechoic chamber when it receives the signals emitted by the radio communication tester. The device under test measures the RSRP-B, thereby obtaining RSRP-B measurement values that are fed back to the radio communication tester, for example the channel emulator. The radio communication tester, for example the channel emulator, takes the respective measurement values into account in order to determine the pre-equalization matrix as described above.

In some embodiments, the reference signal received power per branch measurement values and the presence of additive white Gaussian noise are taken into account when calculating the pre-equalization matrix.

The device under test receives a signal r that is associated with a signal s provided by the radio communication tester. Both signals are associated with each other by $r = A \cdot G \cdot s + n$, wherein A relates to the (ideal) transfer matrix, G relates to the pre-equalization matrix, and n relates to the additive white Gaussian noise. The (optimal/optimized) pre-equalization matrix determined as described above equalizes the (ideal) transfer matrix A and the additive white Gaussian noise (AWGN) n.

Generally, the pre-equalization matrix determined may be applied during the testing of the device under test by the test setup. Accordingly, OTA conformance testing of the device under test can be performed since quasi-conducted test conditions are achieved.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
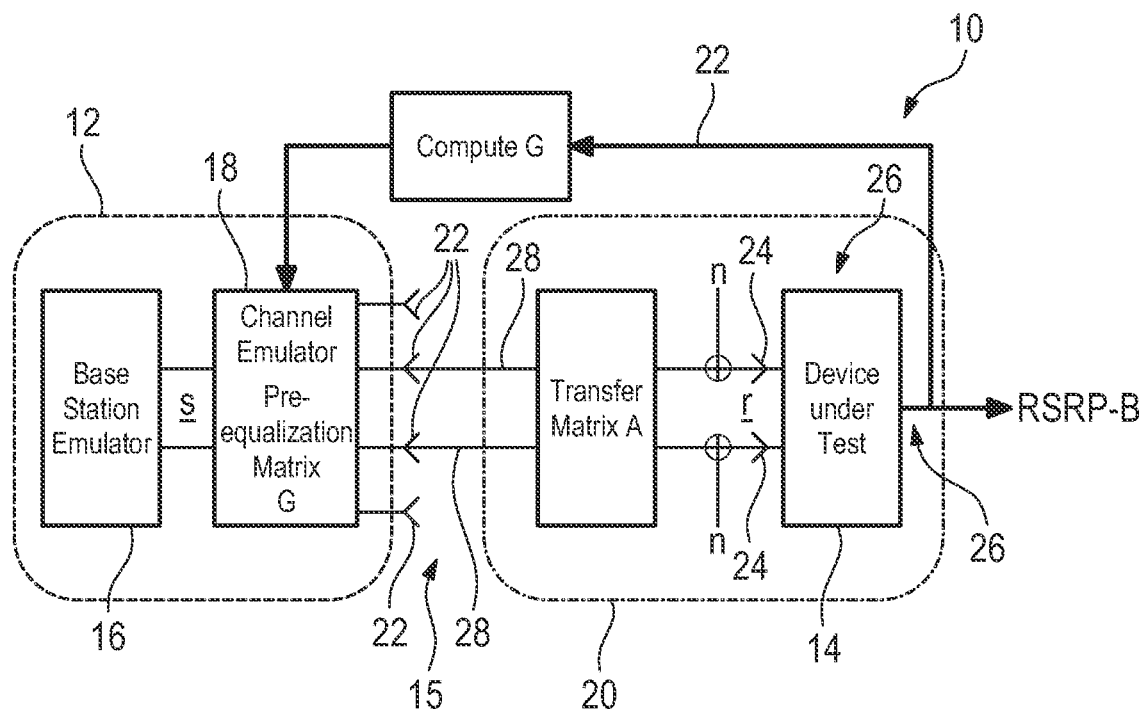
FIG. 1 schematically shows an overview of the test setup according to an embodiment of the present disclosure.

In FIG. 1, a test setup 10 is shown that comprises a radio communication tester 12 and a device under test ("DUT") 14 that communicate with each other via an established radio communication connection 15. The radio communication tester 12 has a base station emulator 16 and a channel emulator 18. The base station emulator 16 and the channel emulator 18 are commonly housed in the housing of the radio communication tester 12. The test setup 10 may also comprise an anechoic chamber 20. The device under test 14 is located within the anechoic chamber 20.

In addition to the radio communication connection 15, a feedback connection 22 is also established between the device under test 14 and the radio communication tester 12, for example the channel emulator 18.

The device under test 14 is configured to perform measurements in order to obtain reference signal received power per branch (RSRP-B) measurement values. Via the feedback connection 22, the device under test 14 is enabled to forward these RSRP-B measurement values gathered to the radio communication tester 12, for example the channel emulator 18. Accordingly, the radio communication tester 12, for example the channel emulator 18, is enabled to consider the RSRP-B measurement values, which are received from the device under test 14 via the feedback connection 22.

In the shown embodiment, the radio communication tester 12 has four transmission antennas 22, whereas the device under test 14 has two reception antennas 24. The reception antennas 24 are associated with respective branches 26 of the device under test 14.

Generally, the radio communication tester 12 and the device under test 14 establish a N×M multiple-input multiple-output (MIMO) connection 15 with each other. For instance, the MIMO connection 15 corresponds to a 2×2 connection.

Figure 2:
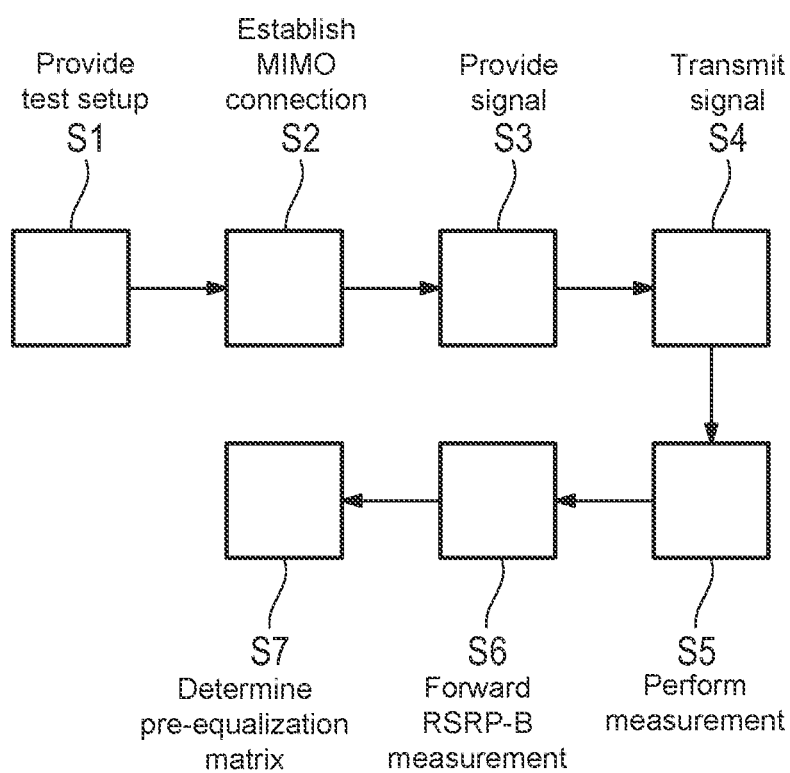
FIG. 2 shows a flow chart of a representative method for determining a pre-equalization matrix to be used for testing according to an embodiment of the present disclosure.
Figure 3:
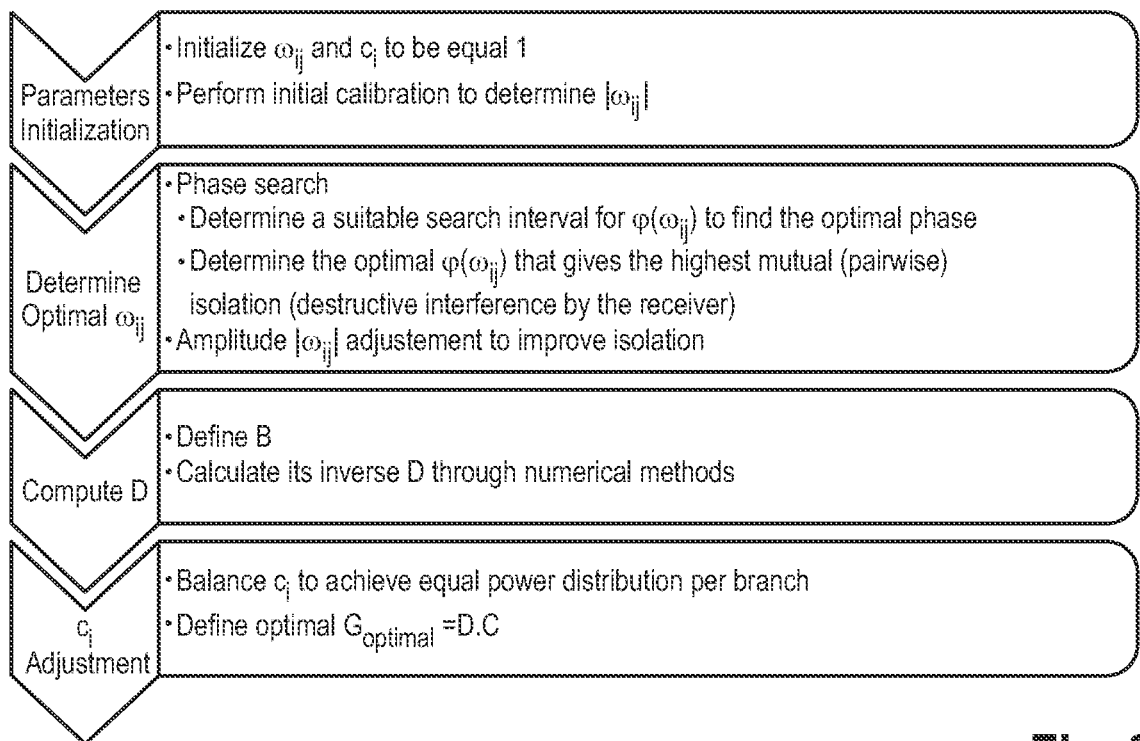
FIG. 3 shows detailed steps of the method illustrated in FIG. 2.

In FIG. 1, two active (intended) channels 28 are illustrated. The test setup 10 shown in FIG. 1 is generally configured to perform a method, such as the method illustrated in FIGS. 2 and 3, wherein FIG. 3 shows detailed steps of the method shown in FIG. 2.

In a first step S1, the test setup 10 as illustrated in FIG. 1 is provided, namely the radio communication tester 12 and the device under test 14. For example, the device under test 14 is located within the anechoic chamber 20.

In a second step S2, the MIMO connection 15, for instance the 2×2 connection, is established between the radio communication tester 12 and the device under test 14.

In a third step S3, a signal is provided by the radio communication tester 12 that represents a certain base station and channel conditions, wherein these characteristics are defined by the base station emulator 16 and the channel emulator 18.

In a fourth step S4, the signal is transmitted into the anechoic chamber 20 and received by the device under test 14 that processes the signal accordingly.

Additive white Gaussian noise (AWGN) may be calculated and introduced into the anechoic chamber 20 such that the device under test 14 additionally receives a signal associated with the AWGN as schematically illustrated in FIG. 1. Alternatively, the AWGN is mathematically considered at a later stage as will be described later. In a fifth step S5, the device under test 14 performs measurements on the signal received in order to obtain reference signal received power per branch (RSRP-B) measurement values.

In a sixth step S6, the RSRP-B measurement values are forwarded via the feedback line 22 to the radio communication tester 12 that processes the information obtained from the device under test 14.

In a seventh step S7, a pre-equalization matrix G is determined. In other words, the pre-equalization matrix G is computed by the radio communication tester 12, for example the channel emulator 18.

When determining/computing the pre-equalization matrix G, the AWGN may be considered in a mathematical manner provided that the AWGN was not introduced into the anechoic chamber 20 previously.

The respective steps to be performed in order to determine/compute the pre-equalization matrix G are illustrated in FIG. 3 in more detail to which reference is made hereinafter.

In general, the pre-equalization matrix G may be computed based on two different matrices, namely a compensation matrix B and a balancing matrix C, wherein the compensation matrix B is inverted such that $G=B^{-1} \cdot C$.

The compensation matrix B comprises compensation parameters $\omega_{ij}$ such that the compensation matrix B can be defined by $$B = \begin{matrix} 1 & \omega_{12} & \omega_{13} \\ \omega_{21} & 1 & \omega_{23} \\ \omega_{31} & \omega_{32} & 1 \end{matrix}.$$

The balancing matrix C comprises balancing parameters $c_i$ such that the balancing matric can be defined by $$C = \begin{matrix} c_1 & 0 & 0 \\ 0 & c_2 & 0 \\ 0 & 0 & c_3 \end{matrix}.$$

Generally, the compensation matrix B compensates cross-talk between the at least two channels 28, whereas the balancing matrix C balances the branches 26 such that the device under test 14 receives equal power at its reception antennas 24.

Accordingly, the pre-equalization matrix G, obtained by multiplying the above-mentioned matrices B, C, compensates cross-talk between the at least two channels 28 and balances the branches 26 such that the device under test 14 receives equal power at its reception antennas 24.

In a first sub-step of determining/estimating the pre-equalization matrix G, an initialization phase may take place as shown in FIG. 3. In the first step, a parameters initialization is done, for instance by setting the compensation parameters $\omega_{ij}$ and the balancing parameters $c_i$ to be equal 1. Generally, each other initialization value can be used, for instance 0, 2 or 3 and so on. For instance, the pre-defined values may be used that are stored on a memory of the radio communication tester 12.

During the first step, an initial calibration is performed in order to determine the amplitude values of the compensation parameters ($|\omega_{ij}|$). In other words, the amplitude values of the compensation parameters are initially calibrated.

This is done by activating only one channel at once, wherein the reference signal received power per branch 26 measurement values are collected by each branch 26. Accordingly, the initially calibrated amplitude values of the compensation parameters can be determined by $$|\omega_{ij}| = \frac{RSRP_{ij}}{RSRP_{ii}},$$

wherein $RSRP_{ij}$ is the RSRP-B from branch $R_j$ while only activating the respective channel $T_i$. This done for each channel $T_i$ such that the initially calibrated amplitude values for all compensation parameters can be determined in a successive manner.

Accordingly, the amplitude values of the compensation parameters are determined during the initial calibration by taking the RSRP-B measurement values into account that are fed back from the device under test 14 to the radio communication tester 12.

Afterwards, the first step, namely the initialization phase comprising the initial calibration, is completed.

In a second sub-step of determining/estimating the pre-equalization matrix G, an optimization phase takes place during which the compensation parameters of the compensation matrix are optimized, as optimal compensation parameters are determined, for example by determining optimal phase values and/or optimal amplitude values for the compensation parameters.

As shown in FIG. 3, the optimal phase values $\varphi(\omega_{ij})$ are determined within a suitable search interval. The optimal phase values are determined by pairwise activating two channels 28 while deactivating all other channels. This is typically done by activating two transmitter antennas 22 while deactivating the other transmitter antennas 22, thereby activating one transmitter pair.

Then, a search algorithm is applied in order to determine the optimal phase values $\varphi(\omega_{ij})$ that provides the highest mutual isolation for the respective transmitter pair of transmitter antennas 22.

The signals emitted by the respective transmitter antennas 22 of the active transmitter pair may be received by a single reception antenna 24 of the device under test 14 at once. Then, the different reception antennas 24 are subsequently exposed to the respective transmitter pair. Alternatively, the reception antennas 24 receive the signals emitted by the respective transmitter pair simultaneously, as they relate to distinguishable branches 26.

In any case, the procedure indicated above is repeated for all possible transmitter pairs such that the optimal phase values for all compensation parameters can be determined.

Afterwards, an amplitude adjustment may take place in order to increase the isolation of the branches 26, thereby optimizing the amplitude values of the compensation parameters ($|\omega_{ij}|$) such that the compensation parameters are optimized in their entirety.

Hence, an optimized compensation matrix B is obtained at the end of the second step, as the compensation matrix B comprises the optimized compensation parameters $\psi_{ij}$.

Accordingly, the radio communication tester 12, for example the channel emulator 18, is configured to selectively activate different numbers of channels 28 when determining the pre-equalization matrix G, namely the compensation matrix B as a part thereof.

In a third sub-step, the (optimized) compensation matrix B is inversed in order to obtain the matrix to be multiplied with the balancing matrix. The inversed compensation matrix B is labeled with D.

In a fourth sub-step, the balancing parameters $c_i$ are adjusted, thereby ensuring that the device under test 14 receives equal power at its reception antennas 24. Accordingly, the respective balancing parameters $c_i$ are adapted with respect to their starting values set during the initialization phase mentioned above.

In a fifth sub-step, the (optimal/optimized) pre-equalization matrix G is defined by multiplying the inverse of the compensation matrix B, namely matrix D, with the balancing matrix C.

As mentioned above, the (optimal/optimized) pre-equalization matrix G compensates cross-talk between the at least two channels 28 and balances the branches 26 such that the device under test 14 receives equal power at its reception antennas 24.

Accordingly, it is not necessary to determine and inverse the channel matrix/transfer matrix in order to pre-equalize the channel(s) 28, as the pre-equalization matrix can be determined/computed/estimated based on the steps indicated above, wherein the AWGN as well as feedback from the device under test 14 via the reference signal received power per branch (RSRP-B) measurement values.

During the steps indicated above, the pre-equalization matrix G can be determined/estimated/computed based on the respective matrices available such that an intermediate pre-equalization matrix G is obtained that differs from the optimal/optimized pre-equalization matrix G. However, the intermediate pre-equalization matrix G is obtained earlier.

Further, it can be verified if the (intermediate) pre-equalization matrix G calculated already solves the optimization problem $\min\|A \cdot G - I\|_2$, wherein I relates to the identity matrix and A relates to the transfer matrix that describes the N×M MIMO connection 15 between the radio communication tester 12 and the device under test 14.

Figure 4:
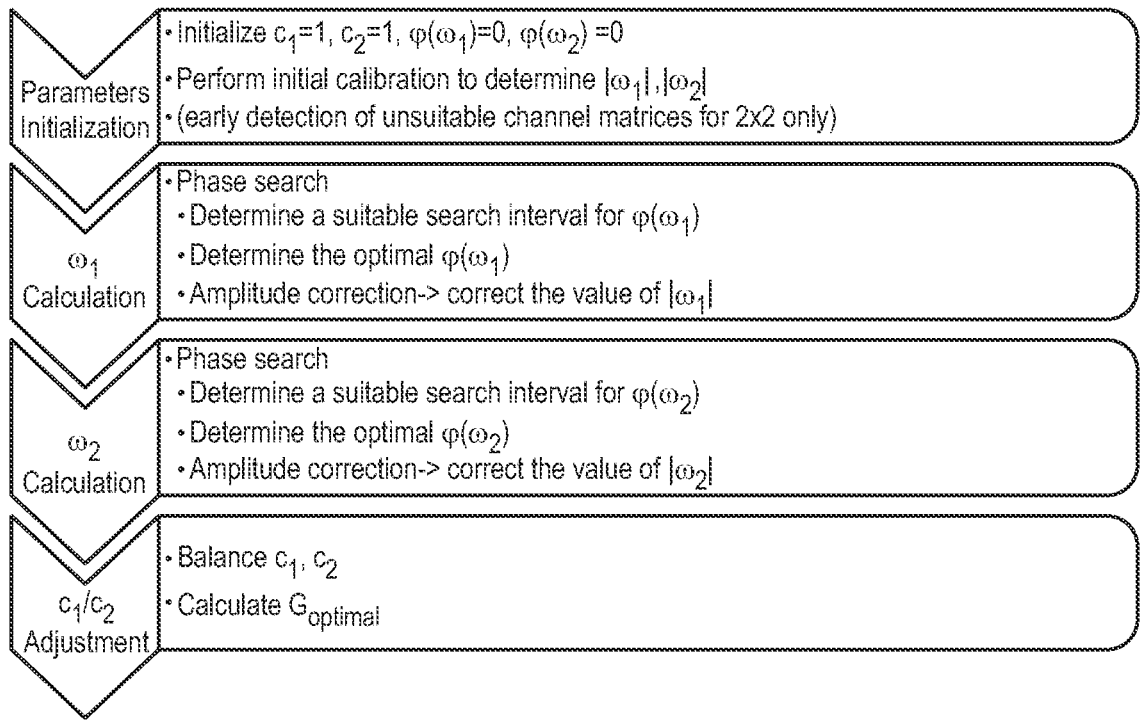
FIG. 4 shows the detailed steps of FIG. 3 for a certain embodiment associated with an established 2×2 MIMO connection.

In FIG. 4, the detailed steps of FIG. 3 are illustrated for a certain embodiment associated with an established 2×2 MIMO connection. Hence, compensation parameters can be labelled as $\omega_1$ and $\omega_2$, as only two compensation parameters for cross-talk compensation are provided. Hence, they are shortened by $\omega_1$ and $\omega_2$ instead of $\omega_{12}$ and $\omega_{21}$.

Accordingly, in the first sub-step, namely the initialization phase, the balancing parameters $c_1$ and $c_2$ are set to be 1, whereas the phase values for the compensation parameters are set to be zero $\varphi(\omega_1)=\varphi(\omega_2)=0$.

Then, the initial calibration takes place in order to initially calibrate the amplitude values for the compensation parameters ($|\omega_1|$, $|\omega_2|$).

In the second sub-step, the optimized values for the phase and amplitude of the respective compensation parameters are determined, for example in a subsequent manner.

Accordingly, the search interval is determined first that is used for identifying the optimal $\varphi(\omega_1)$. Once the optimal phase value has been determined for the respective compensation parameter, the amplitude value $|\omega_1|$ is adjusted accordingly.

Then, the same steps are done for the second compensation parameter such that the optimal phase value $\varphi(\omega_2)$ as well as the optimal amplitude value $|\omega_2|$ for the second compensation parameter are determined.

Thus, the compensation matrix is obtained.

Afterwards, in the third sub-step, the balancing parameters $c_1$ and $c_2$ are adjusted as discussed above.

Then, the optimal/optimized pre-equalization matrix can be determined based on the optimized compensation matrix B and the balanced/adjusted balancing matrix C.

In any case, a fast method, namely a high-speed method, is provided for estimating the pre-equalization matrix for the N×M OTA channel matrix, namely the transfer matrix, wherein this is done based on quantized feedback from the device under test 14 and presence of AWGN, as the RSRP-B measurement values fed back to the radio communication tester 12 are taken into consideration.

Generally, the respective emulator 16, 18 may relate to an emulating circuitry or module. Hence, the radio communication tester 12 may be established by a module.

In some embodiments, the term "module" refers to or includes, inter alia, a combination of hardware (e.g. a processor such as an integrated circuit, digital circuits or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

As briefly described above, certain embodiments disclosed herein, for example the respective module(s), utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In some embodiments, the functionality described herein can be implemented by special purpose hardware-based computer systems or circuits, etc., or combinations of special purpose hardware and computer instructions.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

According to some embodiments, many individual steps of a process may or may not be carried out utilizing computer or computing based systems described herein, and the degree of computer implementation may vary, as may be desirable and/or beneficial for one or more particular applications.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for determining a pre-equalization matrix to be used for testing, the method comprising:
   providing a radio communication tester having a base station emulator and a channel emulator;
   providing a device under test having at least two branches;
   establishing a N×M multiple-input multiple-output (MIMO) connection between the radio communication tester and the device under test, wherein N is a first number equal or greater than 2, and wherein M is a second number equal or greater than 2, the N×M MIMO connection comprising at least two channels;
   forwarding reference signal received power per branch measurement values continuously from the device under test to the radio communication tester; and
   determining a pre-equalization matrix by the radio communication tester, wherein the reference signal received power per branch measurement values and presence of additive white Gaussian noise (AWGN) are taken into account when calculating the pre-equalization matrix, and wherein the pre-equalization matrix compensates cross-talk between the at least two channels and balances the branches of the device under test such that the device under test receives equal power at reception antennas.

2. The method according to claim 1, wherein it is verified if the pre-equalization matrix calculated solves the optimization problem $\min\|A \cdot G - I\|_2$, wherein A relates to a transfer matrix, G relates to the pre-equalization matrix and I relates to the identity matrix.

3. The method according to claim 2, wherein the transfer matrix describes the N×M MIMO connection between the radio communication tester and the device under test.

4. The method according to claim 1, wherein the pre-equalization matrix is obtained by multiplying the inverse of a compensation matrix having compensation parameters and a balancing matrix having balancing parameters.

5. The method according to claim 4, wherein an initialization phase takes place during which the respective parameters of the compensation matrix and the balancing matrix are initialized.

6. The method according to claim 4, wherein an initial calibration of the compensation matrix is performed, thereby initially calibrating amplitude values of the compensation parameters.

7. The method according to claim 6, wherein the amplitude values of the compensation parameters are determined during the initial calibration by taking the reference signal received power per branch measurement values into account.

8. The method according to claim 6, wherein, during the initial calibration, only one channel is activated at once and the reference signal received power per branch measurement values are collected by each branch.

9. The method according to claim 4, wherein the compensation matrix is determined during an optimization phase, thereby optimizing the compensation parameters of the compensation matrix.

10. The method according to claim 9, wherein at least one of optimal phase values or optimal amplitude values for the compensation parameters are determined during the optimization phase.

11. The method according to claim 10, wherein the optimal phase values are determined by pairwise activating two channels while deactivating all other channels.

12. The method according to claim 4, wherein the compensation matrix is determined during an optimization phase, thereby optimizing the compensation parameters of the compensation matrix, and wherein the optimization phase takes place after at least one of the initialization phase or the initial calibration.

13. The method according to claim 5, wherein the compensation matrix is determined during an optimization phase, thereby optimizing the compensation parameters of the compensation matrix, and wherein the optimization phase takes place after at least one of the initialization phase or the initial calibration.

14. The method according to claim 6, wherein the compensation matrix is determined during an optimization phase, thereby optimizing the compensation parameters of the compensation matrix, and wherein the optimization phase takes place after at least one of the initialization phase and the initial calibration.

15. The method according to claim 7 wherein the compensation matrix is determined during an optimization phase, thereby optimizing the compensation parameters of the compensation matrix, and wherein the optimization phase takes place after at least one of the initialization phase and the initial calibration.

16. The method according to claim 8 wherein the compensation matrix is determined during an optimization phase, thereby optimizing the compensation parameters of the compensation matrix, and wherein the optimization phase takes place after at least one of the initialization phase and the initial calibration.

17. The method according to claim 4, wherein the balancing matrix is determined during an adjustment phase, thereby adjusting the balancing parameters.

18. The method according to claim 17, wherein the adjustment phase takes place after the optimization phase, and wherein the compensation matrix is determined during an optimization phase, thereby optimizing the compensation parameters of the compensation matrix.

19. The method according to claim 18, wherein at least one of optimal phase values or optimal amplitude values for the compensation parameters are determined during the optimization phase, and wherein the optimal phase values are determined by pairwise activating two channels while deactivating all other channels.

20. A test setup for testing a device under test, the test setup comprising a radio communication tester and a device under test, wherein the test setup includes circuitry configured to:
  establish a N×M multiple-input multiple-output (MIMO) connection between the radio communication tester and the device under test, wherein N is a first number equal or greater than 2, and wherein M is a second number equal or greater than 2, the N×M MIMO connection comprising at least two channels;
  forward reference signal received power per branch measurement values continuously from the device under test to the radio communication tester; and
  determine a pre-equalization matrix by the radio communication tester, wherein the reference signal received power per branch measurement values and presence of additive white Gaussian noise (AWGN) are taken into account when calculating the pre-equalization matrix, and wherein the pre-equalization matrix compensates cross-talk between the at least two channels and balances the branches of the device under test such that the device under test receives equal power at reception antennas.

* * * * *